US009317480B2

(12) United States Patent
Baksheev et al.

(10) Patent No.: US 9,317,480 B2
(45) Date of Patent: Apr. 19, 2016

(54) METHOD AND APPARATUS FOR REDUCED MEMORY FOOTPRINT FAST FOURIER TRANSFORMS

(75) Inventors: Dmitry D. Baksheev, Novosibirsk (RU); Evgueni S. Petrov, Novosibirsk (RU); Vladimir S. Petrov, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 358 days.

(21) Appl. No.: 13/994,828

(22) PCT Filed: Mar. 12, 2012

(86) PCT No.: PCT/RU2012/000170
§ 371 (c)(1),
(2), (4) Date: Oct. 22, 2013

(87) PCT Pub. No.: WO2013/137759
PCT Pub. Date: Sep. 19, 2013

(65) Prior Publication Data
US 2014/0181168 A1 Jun. 26, 2014

(51) Int. Cl.
*G06F 17/14* (2006.01)
(52) U.S. Cl.
CPC .................................. *G06F 17/142* (2013.01)
(58) Field of Classification Search
CPC .......... G06F 7/141; G06F 7/142; G06F 7/144
See application file for complete search history.

(56) References Cited

U.S. PATENT DOCUMENTS

| | | | | |
|---|---|---|---|---|
| 6,098,088 A | * | 8/2000 | He | G06F 17/142 708/406 |
| 2008/0126462 A1 | * | 5/2008 | Xu | G06F 17/142 708/405 |
| 2009/0160576 A1 | * | 6/2009 | Dent | H01Q 3/40 333/139 |

FOREIGN PATENT DOCUMENTS

EP 1076296 A2 2/2001

OTHER PUBLICATIONS

International Search Report and Written Opinion received for PCT application No. PCT/RU2012/000170, mailed on Jan. 17, 2013, 16 Pages.

(Continued)

*Primary Examiner* — Chuong D Ngo
(74) *Attorney, Agent, or Firm* — Grossman, Tucker, Perreault & Pfleger, PLLC

(57) ABSTRACT

Generally, this disclosure describes a method and apparatus for reduced memory footprint fast Fourier transforms (FFTs). An apparatus may include intermediate factor circuitry configured to generate an intermediate factors vector including a number of intermediate factors in response to a request to generate an FFT of an N-point input data set, N composite, wherein N is equal to a product of a number of nonunity integer factors, the number of intermediate factors is related to the nonunity integer factors of N and the number of intermediate factors is less than N. The apparatus may include intermediate result circuitry configured to reconstruct a subset of twiddle factors based at least in part on an element by element product of a first subset of the intermediate factors vector and a complex conjugate of a second subset of the intermediate factors vector, wherein the twiddle factors are complex roots of unity.

27 Claims, 3 Drawing Sheets

(56) References Cited

OTHER PUBLICATIONS

Bailey, David H., "FFTs in External or Hierarchical Memory", Journal of Supercomputing, vol. 4, Issue 1, Dordrecht, NL, Mar. 1990, pp. 23-35.

Conte et al.,"Optimal Chip-Package Codesign for High-Performance DSP", IEEE Transactions on Advanced Packaging, vol. 28, Issue 2, Piscataway, NJ, USA, May 2005, pp. 288-297.

Franchetti et al.,"FFT Algorithms for Multiply-Add Architecture", 2nd International Conference APLIMAT 2003, Jan. 2003, pp. 333-339.

Johnson et al., "A Modified Split-Radix FFT With Fewer Arithmetic Operations", IEEE Transactions on Signal Processing, IEEE Service Center, vol. 54, Issue 1, NY, US, Jan. 2007, pp. 111-119.

Tasche et al., "Improved Roundoff Error Analysis for Precomputed Twiddle Factors", Journal of Computational Analysis and Applications, vol. 4, Jan. 1, 2002, pp. 1-18.

J.W. Cooley et al., "An algorithm for machine calculation of complex Fourier series", 1965, pp. 297-310.

P. Duhamel et al. "Fast Fourier Transforms: A tutorial review and a state of the art", Signal Processing, vol. 19, 1990.

\* cited by examiner

METHOD AND APPARATUS FOR REDUCED MEMORY FOOTPRINT FAST FOURIER TRANSFORMS

FIELD

This disclosure relates to Fast Fourier Transforms (FFTs), more particularly reduced memory footprint FFTs.

BACKGROUND

A Fourier transform may be used to determine a spectrum (frequency content) of an input waveform. A discrete Fourier transform (DFT) may be applied to a sampled version of the input waveform. Fast Fourier Transform (FFT) corresponds to techniques for determining DFTs of the sampled input waveform that typically require fewer complex multiplications and/or additions than naïve $O(N^2)$ computations of the DFT.

Determining the FFT includes complex multiplications by complex roots of unity called twiddle factors, with the number of the twiddle factors depending on a number of samples of the input waveform. If the number of samples is relatively large, the number of the twiddle factors and the number of points in the output spectrum are also relatively large. The samples of the input waveform, the twiddle factors and the output spectrum may be stored in the system memory. Thus, the memory footprint (amount of memory used) depends on the number of samples and the number of twiddle factors. For example, the memory footprint may correspond to three times the number of samples in order to accommodate the samples of input waveform, the twiddle factors and the output spectrum. This memory footprint may exceed the capacity of the system memory in some situations. It may therefore be desirable to reduce this memory footprint.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
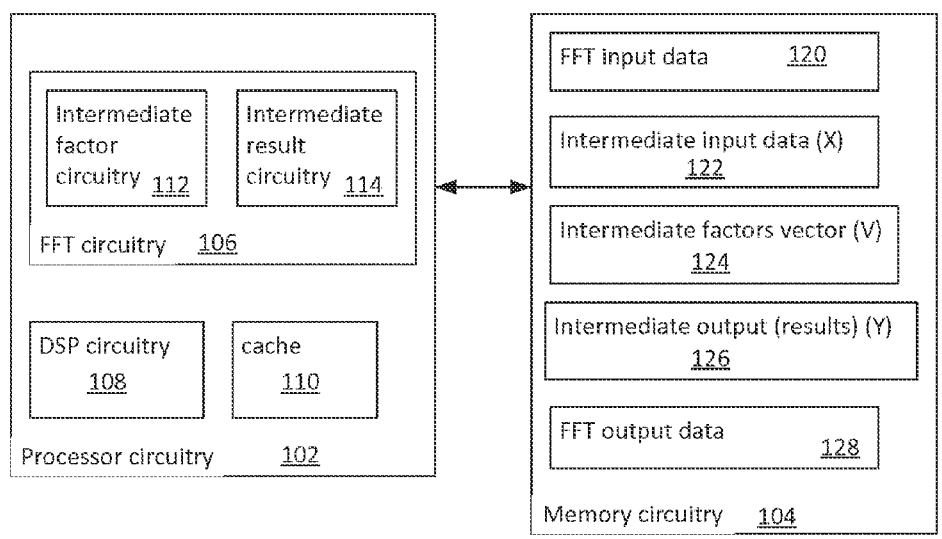
FIG. 1 illustrates a system consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

One rather well-known FFT technique is the Cooley-Tukey algorithm. (J. W. Cooley and J. W. Tukey, "An algorithm for machine calculation of complex Fourier series", *Math Comp.*, Vol. 19, April 1965, pp. 297-301.) The Cooley-Tukey algorithm reduces the number of operations for an N-point input data set from $N^2$ for a naïve computation to on the order of N $\log_2$ N using a Cooley-Tukey FFT. For relatively large N, this reduction in operations can be significant. The Cooley-Tukey technique is considered a "divide and conquer" technique that is limited to composite input data sets. Composite means that the number of samples is not prime. In other words, the number of samples, N, is the product of at least two non-unity integers.

There are other FFT techniques that utilize twiddle factors. Examples of other techniques that utilize twiddle factors in determining an FFT of an N-point input data set, N composite, include, but are not limited to, the Pease algorithm, the Stockham algorithm, the transposed Stockham algorithm, and variations of recursive applications of the Cooley-Tukey technique.

The twiddle factors depend on the number (N) of data points but do not depend on values of input data. Thus, the twiddle factors may be precomputed and stored for example in a table in memory. An N-point FFT where $N=N_1*N_2$, for example, may use N precomputed twiddle factors. Reduced memory footprint techniques may be configured to reduce the number of the precomputed twiddle factors, for example to on the order $\sqrt{N}$ for $N_1 \approx N_2 \approx \sqrt{N}$. Such techniques are not without cost. For example, a vector scaling method may reduce memory footprint but at a cost of accumulated round-off error. In another example, an index splitting method may reduce memory footprint but at a cost of both irregular memory access pattern and additional index computation overhead.

Generally, this disclosure describes an apparatus and method related to determination of a fast Fourier transform (FFT) of a relatively large one-dimensional set of input data. The method and apparatus are configured to reduce the memory footprint associated with storing the complex roots of unity ("twiddle factors"). While the apparatus and method may be utilized with relatively smaller input data sets, a benefit is greater for relatively large data sets. "Relatively large" corresponds to N (the number of points of the input data set) on the order of at least one thousand with an upper limit that may be related to the storage capacity of the apparatus configured to determine the FFT. Relatively large data sets may include, but are not limited to, seismic data, radio astronomy data, data sets associated with high resolution spectrum estimation and multiplication of large multiple-precision integers. Such data sets may include on the order of millions of data points.

The method and apparatus are further configured to enhance memory locality and facilitate vectorization of operations associated with determining an FFT of an N-point one-dimensional array of input data. The method and apparatus are configured to reduce the memory footprint without accumulating round-off error and without the index computation overhead associated with the index splitting method.

The method and apparatus are configured to determine and store a plurality of intermediate factors in an intermediate factors vector V (one-dimensional array of contiguous memory locations). Similar to the twiddle factors, the intermediate factors may be precomputed. The intermediate factors may then be used to reconstruct the twiddle factors that are used in an intermediate stage of the FFT determination.

For an N-point input data set, where N is a product of a plurality of non-unity integer factors, a size of the intermediate factors vector may be related to a sum of the plurality of factors of N. For relatively large N, the size of the intermediate factors vector is less than N. For example, for N a product of a first factor $N_1$ and a second factor $N_2$ ($N=N_1*N_2$) and $N_1 \approx N_2 \approx \sqrt{N}$, the intermediate factors vector is configured to have a size on the order of $O(\sqrt{N})$.

The intermediate factors vector V is configured to store, in contiguous memory, blocks (subvectors) of intermediate factors as described herein. A first subset (subvector) and a second subset (subvector) of intermediate factors may be loaded from contiguous memory locations (per subset) and a subset of twiddle factors may be reconstructed based on the first subset and second subset of intermediate factors.

The subset of intermediate input data, first subset of intermediate factors and second subset of intermediate factors may be operated on and results stored in a subset of intermediate output data. A subset of intermediate results may be determined by multiplying, element by element, the subset of intermediate input data, the first subvector and a complex conjugate of the second subvector. A size of the subsets may be based on at least one nonunity factor of N. The size of the subsets may be based, at least in part, on circuitry configured to perform the operations. For example, the size of the subsets may correspond to a register size. In another example, the subset size may correspond to a cache line size. The operations may be repeated for each subset of intermediate input data.

It should be noted that, although the input data set is one-dimensional, operations associated with generating an FFT result may include mapping the one-dimensional input data into a multidimensional array. This mapping is configured to facilitate operations associated with generating the FFT result. Thus, a one-dimensional data set may be viewed as a multidimensional array based on this mapping. The multidimensional view provides a convenient technique for describing blocks (e.g., subsets) of data where a number of blocks and a size of the blocks are related to the factors of N. The dimension of the input data set itself remains one.

For example, for $N=N_1*N_2$, the N-point input data set may be mapped into an $N_1$ by $N_2$ input data array that may be viewed as having $N_1$ rows and $N_2$ columns. The mapping may result in column-major order where elements of each column are in contiguous memory locations or in row-major order where elements of each row are in contiguous memory locations. Continuing with this example, for column-major order, a subset may include $N_1$ elements corresponding to a column of the input data array and for row-major order, a subset may include $N_2$ elements corresponding to a row of the two-dimensional view of the input data set.

Thus as used herein, multidimensional data arrays correspond to this mapping (view) of one-dimensional data. A number of dimensions is related to a number of nonunity integer factors of N, the number of points in the input data set. A size of a block (subset) of data is related to a factor of N.

The apparatus and method are configured to reduce memory footprint while enhancing vectorization, reducing index computational overhead and reducing irregular memory access pattern without increased error accumulation. Thus, when implemented using vector processor circuitry, intermediate results may be determined using SIMD instructions, with improved data locality and improved (i.e., more efficient) cache utilization. In other words, by determining and storing the intermediate factors in contiguous memory locations, each subset may be loaded from a block of contiguous memory locations. Such loads are more efficient than loading a plurality of intermediate factors from noncontiguous and possibly non-local memory locations. Further, operations on such blocks may exploit vector processor architecture (e.g., parallel processing) to enhance efficiency.

Thus, a method and apparatus consistent with the present disclosure are configured to reduce memory footprint and to enhance operational efficiency when determining an FFT of a relatively large set of input data. It should be noted that the method and apparatus may be utilized for performing an inverse FFT of an input data set. As is known in the art, an inverse FFT utilizes twiddle factors with a change in sign on the exponent. It should be noted that both row-major and column-major layouts of the two-dimensional view of intermediate results remain within the scope of this disclosure. Further, a method and apparatus consistent with the present disclosure may be utilized for input data viewed as array of more than two dimensions where the number of points N is equal to a product of more than two nonunity integer factors.

Generation of the intermediate factors vector V is based on a characteristic of the complex roots of unity (twiddle factors). Based on this characteristic, for N a product of a first factor $N_1$ and a second factor $N_2$, $N_1+2N_2-2$ intermediate factors (for a two-dimensional view of input data array) may be used to generate (reconstruct) the twiddle factors included in the generation of the FFT of the N-point input data array ($N=N_1*N_2$). Reconstruction of each twiddle factor includes a complex multiplication of a first intermediate factor and a complex conjugate of a second intermediate factor, as described herein.

The discrete Fourier transform (DFT) may generally be written as:

$$F[j] = \sum_{n=0}^{N-1} T[n] \cdot (w_N)^{jn},$$

$$j = 0, 1, \ldots, N-1$$

where each T[n] corresponds to an element in an FFT input data vector T of length N, each F[j] corresponds to an element in a transformed output data vector F and $$w_N = e^{-\frac{2\pi i}{N}}$$

which corresponds to a complex root of unity. F (the transform result) may be generated utilizing an FFT technique, consistent with the present disclosure.

In a first example and for a composite N where N is a product of a first factor $N_1$ and a second factor $N_2$ ($N=N_1*N_2$), the one-dimensional FFT input data vector T, may be mapped into (viewed as) a two-dimensional FFT input data array R that has, for example, $N_2$ rows and $N_1$ columns of elements $R[n_2, n_1]$. The FFT of T may then be generated by first transposing the input data array R into an $N_1$-by-$N_2$ array P, then determining $N_2$ DFTs of length $N_1$ on the columns of array P (to generate intermediate input data array X), then a point by point multiplication with the twiddle factors (array W) and the intermediate input data array X, then determining $N_1$ DFTs on the rows of the results (intermediate results array Y) of the point by point multiplication, and then storing the result in the FFT output data F. The first example corresponds to a Cooley-Tukey technique.

In a second example, for a composite N where N is a product of a first factor $N_1$ and a second factor $N_2$ ($N=N_1*N_2$), the one-dimensional FFT input data vector T, may be mapped into (viewed as) a two-dimensional FFT input data array R that has, for example, $N_2$ rows and $N_1$ columns of elements $R[n_2, n_1]$. The FFT of T may then be generated by determining $N_2$ DFTs of length $N_1$ on the rows of array R (to generate intermediate input data array X), then a point by point multiplication with the twiddle factors (transposed array $W^T$ in this example) and the intermediate input data array X, then transposing this result into intermediate results array Y, and then determining $N_1$ DFTs on the rows of the results (intermediate results array Y) of the point by point multiplication, and then storing the result in the FFT output data F.

In this second example, the intermediate input data array X may be transposed rather than the input data array R as was transposed in the first example. As should be known to those skilled in the art, a point by point multiplication of the intermediate input data array X with a transposed twiddle factor array $W^T$ and transposing the result of the multiplication upon storage into intermediate results array Y is equivalent to transposing X on loading, performing the point by point multiplication with W (not transposed) and storing the result to Y.

In a third example, for a composite N where N is a product of a first factor $N_1$, a second factor $N_2$ and a third factor $N_3$ ($N=N_1*N_2*N_3$), the one-dimensional FFT input data vector T may be mapped into a three-dimensional FFT input data array R that has, for example, a first dimension with $N_3$ elements, a second dimension with $N_2$ elements and a third dimension with $N_1$ elements $R[n_3, n_2, n_1]$. The FFT may be generated in this example by a plurality of transposes and intermediate FFT operations. The operations of this example include two point by point multiplication stages.

As these three examples illustrate, various techniques for determining the FFT of an N-point input data set, with composite N, include at least one point by point multiplication stage of twiddle factors with an intermediate input data array. Thus, an apparatus and method consistent with the present disclosure may be utilized to reduce the memory footprint associated with the twiddle factors with the addition of a multiplication in order to reconstruct the twiddle factors in the multiplication stage.

The intermediate factors vector V is configured to be utilized in the point by point multiplication stage. The point by point multiplication of the intermediate input data with the twiddle factors may be understood as an element by element multiplication of two matrices (arrays). For example, in the case of the first example (corresponding to a Cooley-Tukey technique):

$$Y[n_1,n_2]=X[n_1,n_2]\cdot W[n_1,n_2]$$

where $n_1=0, \ldots, N_1-1, n_2=0, \ldots, N_2-1$.

Each $Y[n_1, n_2]$ is an intermediate result, each $X[n_1, n_2]$ is an intermediate input and each $W[n_1, n_2]$ is a complex root of unity (twiddle factor). Thus, Y corresponds to an array of intermediate results, X corresponds to an array of intermediate inputs and W corresponds to an array of twiddle factors. The intermediate inputs may be based on at least a portion of the FFT input data. For example, the intermediate inputs may be results of a DFT applied to the portion of the FFT input data. The DFT may be generated using an FFT technique.

Further, $$W[n_1, n_2] = w^{n_1 \cdot n_2}$$

with $$w = e^{-\frac{2\pi i}{N_1 N_2}}$$

where $i = \sqrt{-1}$ so that, $$Y[n_1, n_2] = X[n_1, n_2] \cdot w^{n_1 \cdot n_2}.$$

In other words, each twiddle factor in the array W is a complex root of unity that may be generated based on a first index, $n_1$, associated with the first factor of N, $N_1$, and a second index, $n_2$, associated with the second factor of N, $N_2$. The product of $n_1$ and $n_2$ may be written as:

$$n_1 n_2 = \frac{1}{4}((n_1+n_2)^2 - (n_1-n_2)^2).$$

A complex exponential, v, may then be defined as:

$$v = w^{\frac{1}{4}} = e^{-\frac{\pi i}{2N_1 N_2}}$$

so that $$Y[n_1,n_2]=X[n_1,n_2]\cdot v^{(n_1+n_2)^2} \cdot \bar{v}^{(n_1-n_2)^2}.$$

In other words, each intermediate output equals a corresponding intermediate input multiplied by a first intermediate factor and a complex conjugate of a second intermediate factor. The first intermediate factor corresponds to the complex exponential v raised to a square of a sum of the first index $n_1$ associated with the first nonunity integer factor of N ($N_1$) and the second index $n_2$ associated with the second nonunity integer factor of N ($N_2$). The second intermediate factor corresponds to the complex exponential v raised to a square of a difference of the first index $n_1$ and the second index $n_2$.

An intermediate factors vector V may be defined as:

$$V[k]=v^{k^2}, k=-N_2+1, \ldots, (N_1+N_2-2)$$

where $N_1$ is the first nonunity integer factor of N, $N_2$ is the second nonunity integer factor of N and each element $V[k]=v^{k^2}$ is an intermediate factor. A maximum value and a minimum value of intermediate factors index k are related to the first factor $N_1$ and the second factor $N_2$. In this example, the minimum value of k is $-N_2+1$ corresponding to $n_1-n_2$ with $n_1=0$ and $n_2=-N_2-1$ and the maximum value of k is $N_1+N_2-2$ corresponding to $n_1+n_2$ with $n_1=N_1-1$ and $n_2=N_2-1$. Intermediate factors vector V is configured to include $N_1+2N_2-2$ elements. For N relatively large, $N_1+2N_2-2 \approx N_1+2N_2$. The $N_1+2N_2-2$ elements are configured to be utilized to generate $N=N_1*N_2$ twiddle factors. Thus, a reduced memory footprint vector of size $N_1+2N_2-2$ is configured to provide $N=N_1*N_2$ twiddle factors without occupying N memory locations.

It should be noted that the intermediate factors vector may be similarly determined for other configurations of factors of N. For example, N may have more than two nonunity integer factors (e.g., the third example, described herein).

The intermediate factors vector V may include a plurality of subsets (subvectors) of intermediate factors. For example, each subset of intermediate factors may be configured to include $N_1$ contiguous elements corresponding to a column, $n_2$, of intermediate input array X and related to column $n_2$ of twiddle factor array W. A first subset and a second subset may then be utilized to determine a column of intermediate output array Y as:

$$Y[:,n_2]=X[:,n_2] \odot V[n_2:n_2+N_1-1] \odot \bar{V}[-n_2:-n_2+N_1-1]$$

where $[:,n_2]$ corresponds to column $n_2$ of the intermediate output array and column $n_2$ of the intermediate input array. In other words, $[:,n_2]$ includes all row indices, $n_1=0, \ldots, N_1-1$ of column $n_2$. The symbol $\odot$ corresponds to element-wise multiplication and $\bar{V}$ is the complex conjugate of V.

It should be noted that in this example the first subset ($V[n_2:n_2+N_1-1]$) and the second subset ($V[-n_2:-n_2+N_1-1]$) each include $N_1$ contiguous elements of vector V. The first subset and the second subset may each thus be accessed and/or loaded by, for example, a vector processor. The intermediate output column $Y[:,n_2]$ may be determined using SIMD (single instruction-multiple data) instructions. Continuing with this example, although determining $Y[:,n_2]$ for each column $n_2$ includes two multiplications rather than one multiplication as for $Y[n_1, n_2]=X[n_1, n_2]*W[n_1, n_2]$, the ability to load contiguous elements is configured to provide overall performance improvements for relatively large intermediate input data sets.

Thus, a size of the intermediate factors vector is related to a plurality of nonunity integer factors of N, the number of points in the input data set. The size of the intermediate factors vector is related to a sum of at least a portion of the factors of N. For N relatively large, the size of the intermediate factors vector is less than N, resulting in a reduced memory footprint.

FIG. 1 illustrates a system 100 consistent with various embodiments of the present disclosure. The system 100 generally includes processor circuitry 102 and memory circuitry 104. Memory circuitry 104 may be configured to store FFT input data 120, intermediate input data 122, intermediate factors vector 124, intermediate results 126, and/or output data 128. For example, for FFT input data 120 that includes N input data points (where $N=N_1*N_2$), intermediate input data 122 may include N data points and intermediate factors vector 124 may be configured to include $N_1+2N_2-2$ contiguous memory locations, as described herein. FFT input data 120, intermediate input data 122, intermediate results 126, and/or output data 128 may be included in local memory.

Processor circuitry 102 includes FFT circuitry 106. Processor circuitry 102 may include digital signal processing (DSP) circuitry 108 and/or a processor cache 110. For example, the DSP circuitry 108 may be configured to generate filtered output data based at least in part on input data and user-defined filter characteristics, as is known to those skilled in the art. The processor cache 110 is configured to store recently and/or often used data for generally faster access by other processor circuitry, as is known to those skilled in the art.

For example, processor circuitry 102 may include a vector processor configured to perform operations on a plurality of data in parallel. In another example, processor circuitry 102 may include a multiplier configured to multiply complex numbers. In another example, processor circuitry 102 may include an application specific integrated circuit (ASIC) and/or a system on a chip (SoC) configured to perform operations on a plurality of data in parallel and/or to multiply complex numbers.

The FFT circuitry 106 may include intermediate factor circuitry 112 and intermediate result circuitry 114. The FFT circuitry 106 is configured to receive FFT input data 120 and to generate corresponding FFT output data 128 based on the FFT input data 120. The intermediate factor circuitry 112 is configured to determine intermediate factors and to provide the intermediate factors to memory circuitry 104. The intermediate result circuitry 114 is configured to determine intermediate output (results) 126 based on intermediate input data 122 and the intermediate factors 124 and to provide the intermediate output results 126 to memory circuitry 104. The FFT input data 120 may correspond to a one-dimensional array of size N data points.

In a first example, the FFT circuitry 106 may be configured to convert the one-dimensional N-element vector of FFT input data 120 into an associated two-dimensional array of FFT input data of dimension $N_1$ by $N_2$ where $N=N_1*N_2$. Converting may include mapping the one-dimensional FFT input data into a two dimensional $N_2$ by $N_1$ array and transposing the $N_2$ by $N_1$ array into the two-dimensional ($N_1$ by $N_2$) array of FFT input data. The FFT circuitry 106 is configured to generate a two-dimensional array of intermediate input data 122 based on the FFT input data 120 and to generate an FFT output 128 based on intermediate output data 126.

The intermediate factor circuitry 112 is configured to generate a plurality of intermediate factors $v^{k^2}$ and to provide the intermediate factors to memory circuitry 104 for storage in the intermediate factors vector 124. The intermediate factors may be generated based on $N_1$ and $N_2$ as described herein. Intermediate result circuitry 114 is configured to reconstruct a column of N, twiddle factors by multiplying, element by element, the first subvector of intermediate factors by a complex conjugate of the second subvector of intermediate factors. Intermediate result circuitry 114 is configured to generate intermediate results 126 by multiplying, element by element, the reconstructed twiddle factors and an associated column of intermediate input data. The intermediate result circuitry 114 may then provide the intermediate results 126 to memory circuitry 104. The FFT circuitry 106 is configured to generate FFT output data 128 based, at least in part, on the intermediate results 126.

Thus, in this example, system 100 is configured to determine a fast Fourier transform of FFT input data 120. Intermediate factor circuitry 112 is configured to generate the intermediate factors and to store the intermediate factors in intermediate factors vector 124. The intermediate factors are configured to be utilized to reconstruct N twiddle factors while occupying a reduced memory footprint ($N_1+2N_2-2$). The intermediate factors vector 124 is configured to provide memory locality for the first subset and the second subset of the intermediate factors. This memory locality may improve transforming the input data by reducing memory accesses and facilitating a load-multiply-store sequence configured to process a plurality of intermediate input data in parallel.

Figure 2:
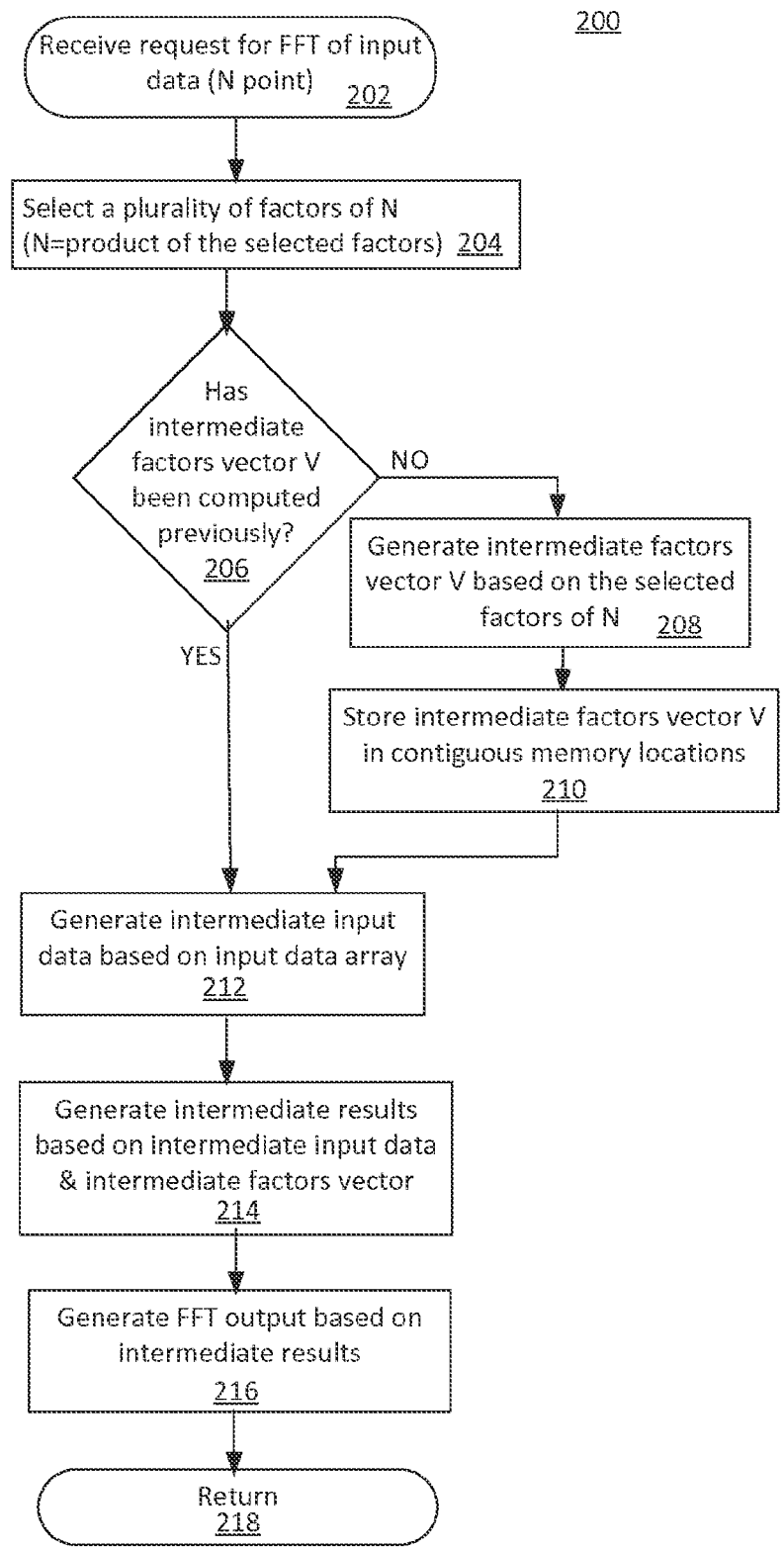
FIG. 2 illustrates a flowchart of exemplary operations for determining a discrete Fourier transform of a one-dimensional array of input data consistent with various embodiments of the present disclosure.

FIG. 2 illustrates a flowchart 200 of exemplary operations for determining a discrete Fourier transform of a one-dimensional array of input data consistent with various embodiments of the present disclosure. The operations may be performed, for example, by the processor circuitry 102, including FFT circuitry 106, intermediate factor circuitry 112 and/or intermediate result circuitry 114. In particular, flowchart 200 depicts exemplary operations configured to generate a Fast Fourier Transform of a one-dimensional array of input data of size N points where N is composite and may be relatively large. The operations of flowchart 200 may be initiated 202 in response to receiving a request to perform a discrete Fourier transform on an identified one-dimensional array of input data of size N points.

Operation 204 may include selecting a plurality of factors of N where N equals a product of the plurality of factors. For example, two factors $N_1$ and $N_2$ such that $N_1*N_2=N$ may be selected. In this example, the two factors may correspond to a two-dimensional view of the intermediate input data array or one dimension may be split and the intermediate input data array may be viewed as three dimensional. In another example, three factors $N_1$, $N_2$ and $N_3$ such that $N=N_1*N_2*N_3$ may be selected. In this example, the three factors may correspond to a three-dimensional view of the intermediate input data array or two dimensions may be collapsed into one dimension so that the intermediate input data is viewed as two-dimensional.

For example, if two factors $N_1$ and $N_2$ are selected, $N_1$ and $N_2$ may be selected so that $N_1 \sim N_2 \sim sqrt(N)$ so that the size of the intermediate factors vector is approximately $3*sqrt(N)$. For N relatively large, $3*sqrt(N)$ is much less than N resulting in a reduced memory footprint associated with the twiddle factors.

Whether the intermediate factors vector V has been previously computed may be determined at operation 206. Generally, the intermediate factors vector V is precomputed once for multiple N-point FFT operations. If the intermediate factors vector has been previously computed, program flow may proceed to operation 212. If the intermediate factors vector has not been previously computed, the intermediate factors vector may be generated, based on the selected factors of N, at operation 208. For example, for selected factors $N_1$ and $N_2$, the intermediate factors vector $V[k]=v^{k^2}$ and $k=-N_2+1, \ldots, N_1+N_2-2$ may be generated, as described herein. Intermediate factors vector V may then include $N_1+2N_2-2$ intermediate factors as described herein. Operation 210 includes storing the intermediate factors in contiguous memory locations, as described herein. Program flow may then proceed to operation 212.

Operation 212 includes generating intermediate input data. For example, for two selected factors $N_1*N_2=N$, the N-point input data set may be converted to a two-dimensional view (for example, by mapping plus transposing) to yield the two-dimensional ($N_1$ by $N_2$) input data array. $N_2$ DFTs of length $N_1$ may then be performed on the columns of the input data array to generate the intermediate input data array X having dimension $N_1$ by $N_2$. The intermediate input data array X may then be stored, for example, in memory circuitry 104.

Figure 3:
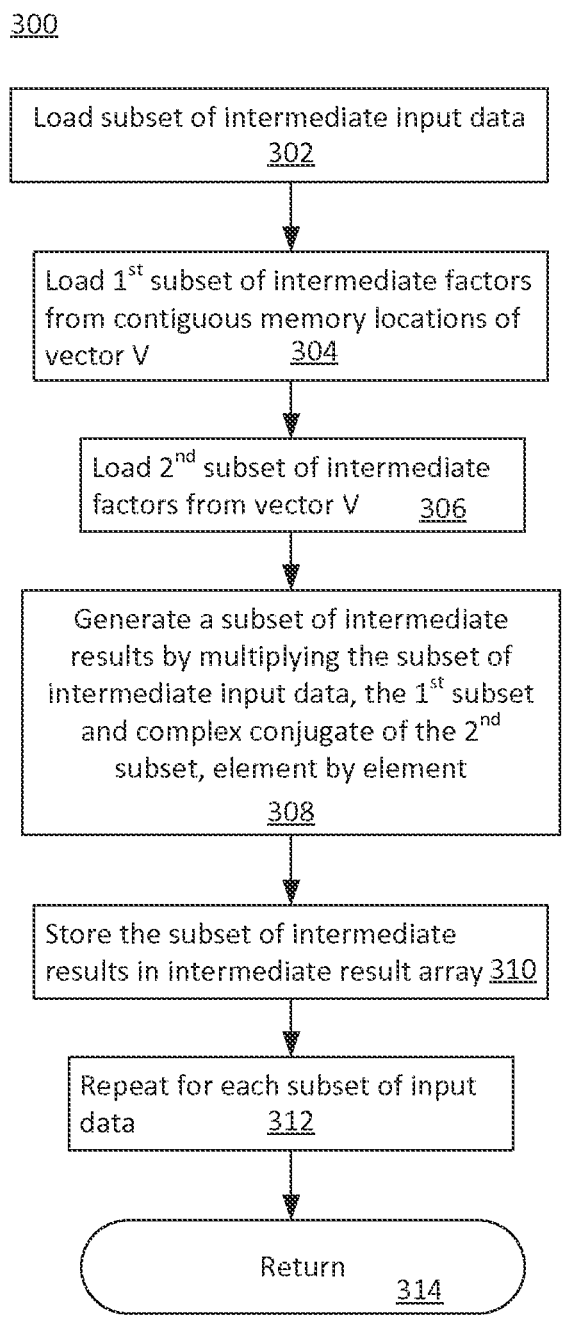
FIG. 3 illustrates a flowchart of exemplary operations consistent with an embodiment of the present disclosure.

Intermediate results array Y may be generated at operation 214 based on the intermediate input data array X and intermediate factors vector V. The intermediate results Y may then be stored, for example, in memory circuitry 104. The operations associated with operation 214 are described in more detail below (FIG. 3). Operation 216 includes generating an FFT output based on the intermediate results. For example, for a two-dimensional intermediate input data array, $N_1$ DFTs of length $N_2$ may then be performed on the rows of the intermediate results array to generate the FFT output. The FIT output may then be stored, for example, in memory circuitry 104. Program flow may then return at operation 218.

In this embodiment (flowchart 200), operations 206, 208 and 210 may be performed between operations 204 and 212. In another embodiment, operations 206, 208 and 210 may be performed between operations 212 and 214, within the scope of the present disclosure.

FIG. 3 illustrates a flowchart 300 of exemplary operations consistent with an embodiment of the present disclosure. The operations may be performed, for example, by the processor circuitry 102, including intermediate factor circuitry 112 and/or intermediate result circuitry 114. Flowchart 300 relates to operation 214 of flowchart 200. Operation 302 includes loading a subset of intermediate input data, for example, column $X[:,n_2]$. Operation 304 includes loading a first subset (for example, $V[n_2:n_2+N_1-1]$) of intermediate factors from contiguous memory locations of intermediate factors vector V. For example, the first subset is configured to include $N_1$ elements corresponding to intermediate factors vector index $k=n_2, \ldots, n_2+N_1-1$, where $n_2$ corresponds to a column index.

Operation 306 includes loading a second subset (for example, $V[-n_2:-n_2+N_1-1]$) of intermediate factors from contiguous memory locations of intermediate factors vector V. For example, the second subset is configured to include $N_1$ elements corresponding to intermediate factors vector index $k=-n_2, \ldots, -n_2+N_1-1$, where $n_2$ corresponds to a column index.

Operation 308 includes generating a subset of intermediate results for the subset of intermediate input data. The subset of intermediate results may be generated by multiplying, element by element, the subset of intermediate input data, the first subset of the intermediate factors vector V and a complex conjugate of the second subset of the intermediate factors vector V. For example, the subset of intermediate input data may correspond to a column of intermediate input data and the subset of intermediate results may correspond to a column of intermediate results.

Each subset of intermediate results may be stored in an intermediate result array at operation 310. Operation 312 includes repeating operations 302, 304, 306, 308 and 310, for example, for each column $n_2=0, \ldots, N_2-1$ of intermediate input data. Program flow may return at operation 314.

Thus, intermediate results may be generated for an N-point FFT of an N-point data set where N is composite, by reconstructing N twiddle factors based on a vector of intermediate factors. N may be relatively large. For example, for N equal to a product of a first factor $N_1$ and a second factor $N_2$, the vector of intermediate factors may have a memory footprint on the order of $N_1+2N_2$. The operations include an additional multiplication to generate the twiddle factors. The intermediate factors vector is configured to enhance vectorization, for example, to facilitate loading subvectors of intermediate factors and SIMD processing to obtain the twiddle factors.

While FIGS. 2 and 3 illustrate various operations according to various embodiments, it is to be understood that not all of the operations depicted in FIGS. 2 and 3 are necessary for other embodiments. Indeed, it is fully contemplated herein that in other embodiments of the present disclosure, the operations depicted in FIGS. 2 and 3 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Table 1 illustrates operations configured to generate an FFT of an N-point input data set T consistent with an embodiment of the present disclosure. The operations of Table 1 correspond to the first example described above where N is the product of a first factor $N_1$ and a second factor $N_2$. In this example, the N-point input data set is mapped into a two-dimensional input data array that is transposed (line 2) prior to the multiplication stage (lines 4 and 5). It should be noted that lines 4 and 5 illustrate vectorization of the multiplication stage. The intermediate factors vector V has been generated prior to the operations illustrated in Table 1. Underlined dimensions (e.g., $N_1$ in line three) correspond to the dimensions along which the FFT may be computed.

TABLE 1

1. X1(N2,N1) := view_as_N2_by_N1_array( T(N) )
2. X2(N1,N2) := transpose( X1(N2,N1) )
3. X3(N1,N2) := perform_N2_FFT_N1( X2($\underline{N1}$,N2) )
4. for n2=0:N2-1
5. X4(0:N1-1,n2) := X3(0:N1-1,n2) * V(n2:n2+N1-1) * conj( V(-n2:-n2+N1-1) )
6. X5(N1,N2) := perform_N1_FFT_N2( X4(N1,$\underline{N2}$) )
7. F(N) := view_as_N_array( X5(N1,N2) )

Table 2 illustrates operations configured to generate an FFT of an N-point input data set consistent with an embodiment of the present disclosure. The operations of Table 2 correspond to the second example described above where N is the product of a first factor $N_1$ and a second factor $N_2$ and transposing occurs in the multiplication stage. Similar to the operations illustrated in Table 1, the intermediate factors vector V has been generated prior to the operations illustrated in Table 2. Underlined dimensions (e.g., $N_1$ in line two) correspond to the dimensions along which the FFT may be computed. In this example, the N-point input data set is mapped into a two-dimensional input data array that is transposed in the multiplication stage (corresponding to lines 3 and 4 of Table 2).

TABLE 2

1. X1(N2,N1) :=view_as_N2_by_N1_array( T(N) )
2. X2(N2,N1) := perform_N2_FFT_N1( X1(N2,<u>N1</u>) )
3. for n1=0:N1-1 do:
4. X3(n1,0:N2-1) := X2(0:N2-1,n1) * V(n1:n1+N2-1) * conj(V(n1-N2+1:n1)
5. X4(N1,N2) := perform_N1_FFT_N2( X3(N1,<u>N2</u>) )
6. F(N) :=view_as_N_array( X4(N1,N2) )

Table 3 illustrates operations configured to generate an FFT of an N-point input data set consistent with an embodiment of the present disclosure. The operations of Table 3 correspond to the third example described above where N is the product of a first factor $N_1$, a second factor $N_2$ and a third factor $N_3$. In this example, the N-point input data set is mapped into a three-dimensional input data array. The operations of this example include two multiplication stages, a first multiplication stage corresponding to lines 4 and 5 and a second multiplication stage corresponding to lines 8 and 9. The number of twiddle factors associated with the first multiplication stage is greater than the number of twiddle factors associated with the second multiplication stage. Utilizing an intermediate factors vector consistent with various embodiments of the present disclosure to reconstruct the twiddle factors may thus confer a greater benefit to the first multiplication stage than may be conferred to the second multiplication stage.

TABLE 3

1. X1(N3,N2,N1) :=view_as_3D_array( T(N) )
2. X2(N1,N3,N2) := transpose( X1(N3,N2,N1) )
3. X3(N1,N3,N2) := perform_N3xN2_FFT_N1( X2(<u>N1</u>,N3,N2) )
4. for n1=0:N1-1, n3=0:N3-1, n2=0:N2-1 do:
5. X4(n1,n3,n2) := X3(n1,n3,n2) * V(n1+n3+N3*n2) * conj( V(n1-n3-N3*n2) )
6. X5(N1,N2,N3) :=transpose( X4(N1,N3,N2) )
7. X6(N1,N2,N3) := perform_N1xN3_FFT_N2( X5(N1,<u>N2</u>,N3) )
8. for n1=0:N1-1, n2=0:N2-1, n3=0:N3-1 do:
9. X7(n1,n2,n3) := X6(n1,n2,n3) * V(N1*n2+n3) * conj( V(N1*n2-n3) )
10. X8(N1,N2,N3) := perform_N1xN2_FFT_N3( X7(N1,N2,<u>N3</u>) )
11. F(N) :=view_as_N_array( X8(N1,N2,N3) )

Thus, Tables 1 through 3 illustrate various techniques for generating an FFT of an N-point input data set, N composite, i.e., N is a product of a plurality of nonunity integer factors. An intermediate factors vector V may be generated and stored in contiguous memory locations prior to performing the FFT operations. A number of intermediate factors included in the intermediate factors vector V (i.e., size of the intermediate factors vector) is related to a sum of at least a portion of the factors of N. The intermediate factors vector may be generated once and used in a plurality of N-point FFT determinations. An intermediate factors vector V consistent with various embodiments of the present disclosure is configured to facilitate vectorizing the multiplication stage of an FFT determination while reducing the memory footprint associated with storing the twiddle factors. Further, reconstructing the twiddle factors based, at least in part, on subsets of the intermediate factors vector is not restricted to one particular FFT technique.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical locations. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

"Circuitry", as used in any embodiment herein, may comprise, for example, singly or in any combination, hardwired circuitry, programmable circuitry, state machine circuitry, and/or firmware that stores instructions executed by programmable circuitry. The circuitry may be embodied as an integrated circuit, such as an integrated circuit chip.

Thus, an apparatus and method related to determination of a fast Fourier transform of a one-dimensional set of input data has been described. The set of input data may be relatively large. The method and apparatus are configured to reduce the memory footprint associated with the complex roots of unity ("twiddle factors"), to enhance memory locality and facilitate vectorization of operations associated with determining an FFT of an N-point one-dimensional array of input data. The method and apparatus are configured to reduce the memory footprint without accumulating round-off error with the addition of a complex multiplication.

According to one aspect there is provided an apparatus. The apparatus may include intermediate factor circuitry configured to generate an intermediate factors vector including a number of intermediate factors in response to a request to FFT circuitry to generate a fast Fourier transform (FFT) of an N-point input data set, N composite, wherein N is equal to a product of a number of nonunity integer factors, the number of intermediate factors is related to the nonunity integer factors of N and the number of intermediate factors is less than N. The apparatus may further include memory circuitry configured to store the intermediate factors vector in contiguous memory locations. The apparatus may further include intermediate result circuitry configured to reconstruct a subset of twiddle factors based at least in part on an element by element product of a first subset of the intermediate factors vector and a complex conjugate of a second subset of the intermediate factors vector, each of the first subset and the second subset loaded from contiguous memory locations in the memory circuitry, wherein the twiddle factors are complex roots of unity configured to be used in generating the FFT.

According to another aspect there is provided a method. The method may include generating an intermediate factors vector comprising a number of intermediate factors in response to a request to FFT circuitry to generate a fast Fourier transform (FFT) of an N-point input data set, N composite, wherein N is equal to a product of a number of nonunity integer factors, the number of intermediate factors is related to the nonunity integer factors of N and the number of intermediate factors is less than N; storing the intermediate factors vector in contiguous memory locations in memory circuitry; and reconstructing a subset of twiddle factors based at least in part on an element by element product of a first subset of the intermediate factors vector and a complex conjugate of a second subset of the intermediate factors vector, each of the first subset and the second subset loaded from the contiguous memory locations in the memory circuitry, wherein the twiddle factors are complex roots of unity configured to be used in generating the FFT.

According to another aspect there is provided a system. The system may include one or more storage mediums having stored thereon, individually or in combination, instructions that when executed by one or more processors result in the following operations comprising: generating an intermediate factors vector comprising a number of intermediate factors in response to a request to FFT circuitry to generate a fast Fourier transform (FFT) of an N-point input data set, N composite, wherein N is equal to a product of a number of nonunity integer factors, the number of intermediate factors is related to the nonunity integer factors of N and the number of intermediate factors is less than N; storing the intermediate factors vector in contiguous memory locations in memory circuitry; and reconstructing a subset of twiddle factors based at least in part on an element by element product of a first subset of the intermediate factors vector and a complex conjugate of a second subset of the intermediate factors vector, each of the first subset and the second subset loaded from the contiguous memory locations in the memory circuitry, wherein the twiddle factors are complex roots of unity configured to be used in generating the FFT.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus comprising:
    intermediate factor circuitry configured to generate an intermediate factors vector comprising a number of intermediate factors in response to a request to FFT circuitry to generate a fast Fourier transform (FFT) of an N-point input data set, N composite, wherein N is equal to a product of a number of nonunity integer factors, the number of intermediate factors is related to the nonunity integer factors of N and the number of intermediate factors is less than N;
    memory circuitry configured to store the intermediate factors vector in contiguous memory locations; and
    intermediate result circuitry configured to reconstruct a subset of twiddle factors based at least in part on an element by element product of a first subset of the intermediate factors vector and a complex conjugate of a second subset of the intermediate factors vector, each of the first subset and the second subset loaded from contiguous memory locations in the memory circuitry, wherein the twiddle factors are complex roots of unity configured to be used in generating the FFT.

2. The apparatus of claim 1, wherein
    the number of intermediate factors stored in the intermediate factors vector is related to a sum of at least a portion of the nonunity integer factors of N.

3. The apparatus of claim 1, wherein
    the first subset of the intermediate factors vector and the second subset of the intermediate factors vector correspond to a size of a register associated with intermediate results circuitry.

4. The apparatus of claim 1, wherein
    each intermediate factor of the first subset of the intermediate factors vector corresponds to a complex exponential raised to a square of a sum of a first index associated with a first nonunity integer factor of N and a second index associated with a second nonunity integer factor of N and
    each intermediate factor of the second subset of the intermediate factors vector corresponds to the complex exponential raised to a square of a difference of the first index associated with the first nonunity integer factor of N and the second index associated with the second nonunity integer factor of N.

5. The apparatus of claim 4, wherein
    the number of intermediate factors corresponds to a sum of the first nonunity integer factor of N and twice the second nonunity integer factor of N minus two.

6. The apparatus of claim 1, further comprising:
    FFT circuitry configured to generate an intermediate input data array wherein a number of dimensions of the intermediate input data array is related to the number of nonunity integer factors of N, the memory circuitry configured to store the intermediate input data array.

7. The apparatus of claim 6, wherein
    the intermediate result circuitry is further configured to generate an intermediate output array based on the intermediate factors and the intermediate input data array, and
    the memory circuitry is further configured to store the intermediate output array.

8. The apparatus of claim 7, wherein the FFT circuitry is further configured to generate an output data set corresponding to the FFT of the input data set based at least in part on the intermediate output array.

9. The apparatus of claim 6, wherein
    the intermediate result circuitry is further configured to multiply a subset of the intermediate input data array by the first subset of the intermediate factors vector and complex conjugates of the second subset of the intermediate factors vector, element by element, to generate a subset of an intermediate output array and the memory circuitry is configured to store the subset of the intermediate output array.

10. A method comprising:
    generating an intermediate factors vector comprising a number of intermediate factors in response to a request to FFT circuitry to generate a fast Fourier transform (FFT) of an N-point input data set, N composite, wherein N is equal to a product of a number of nonunity integer factors, the number of intermediate factors is related to the nonunity integer factors of N and the number of intermediate factors is less than N;
    storing the intermediate factors vector in contiguous memory locations in memory circuitry; and
    reconstructing a subset of twiddle factors based at least in part on an element by element product of a first subset of the intermediate factors vector and a complex conjugate of a second subset of the intermediate factors vector, each of the first subset and the second subset loaded from the contiguous memory locations in the memory circuitry, wherein the twiddle factors are complex roots of unity configured to be used in generating the FFT.

11. The method of claim 10, wherein
    the number of intermediate factors in the intermediate factors vector is related to a sum of at least a portion of the nonunity integer factors of N.

12. The method of claim 10, wherein
the first subset of the intermediate factors vector and the second subset of the intermediate factors vector correspond to a size of a register associated with intermediate results circuitry.

13. The method of claim 10, wherein
each intermediate factor of the first subset of the intermediate factors vector corresponds to a complex exponential raised to a square of a sum of a first index associated with a first nonunity integer factor of N and a second index associated with a second nonunity integer factor of N and
each intermediate factor of the second subset of the intermediate factors vector corresponds to the complex exponential raised to a square of a difference of the first index associated with the first nonunity integer factor of N and the second index associated with the second nonunity integer factor of N.

14. The method of claim 13, wherein
the number of intermediate factors corresponds to a sum of the first nonunity integer factor of N and twice the second nonunity integer factor of N minus two.

15. The method of claim 10, further comprising:
generating an intermediate input data array wherein a number of dimensions of the intermediate input data array is related to the number of nonunity integer factors of N; and
storing the intermediate input data array in the memory circuitry.

16. The method of claim 15, further comprising:
generating an intermediate output array based on the intermediate factors and the intermediate input data array, and
storing the intermediate output array in contiguous memory locations.

17. The method of claim 16, further comprising:
generating an output data set corresponding to the FFT of the input data set based at least in part on the intermediate output array.

18. The method of claim 15, further comprising:
multiplying a subset of the intermediate input data array by the first subset of the intermediate factors vector and complex conjugates of the second subset of the intermediate factors vector, element by element, to generate a subset of an intermediate output array and storing the subset of the intermediate output array in contiguous memory locations.

19. A system comprising one or more storage mediums having stored thereon, individually or in combination, instructions that when executed by one or more processors result in the following operations comprising:
generating an intermediate factors vector comprising a number of intermediate factors in response to a request to FFT circuitry to generate a fast Fourier transform (FFT) of an N-point input data set, N composite, wherein N is equal to a product of a number of nonunity integer factors, the number of intermediate factors is related to the nonunity integer factors of N and the number of intermediate factors is less than N;
storing the intermediate factors vector in contiguous memory locations in memory circuitry; and
reconstructing a subset of twiddle factors based at least in part on an element by element product of a first subset of the intermediate factors vector and a complex conjugate of a second subset of the intermediate factors vector, each of the first subset and the second subset loaded from the contiguous memory locations in the memory circuitry, wherein the twiddle factors are complex roots of unity configured to be used in generating the FIT.

20. The system of claim 19, wherein the number of intermediate factors in the intermediate factors vector is related to a sum of at least a portion of the nonunity integer factors of N.

21. The system of claim 19, wherein the first subset of the intermediate factors vector and the second subset of the intermediate factors vector correspond to a size of a register associated with intermediate results circuitry.

22. The system of claim 19, wherein each intermediate factor of the first subset of the intermediate factors vector corresponds to a complex exponential raised to a square of a sum of a first index associated with a first nonunity integer factor of N and a second index associated with a second nonunity integer factor of N and
each intermediate factor of the second subset of the intermediate factors vector corresponds to the complex exponential raised to a square of a difference of the first index associated with the first nonunity integer factor of N and the second index associated with the second nonunity integer factor of N.

23. The system of claim 22, wherein the number of intermediate factors corresponds to a sum of the first nonunity integer factor of N and twice the second nonunity integer factor of N minus two.

24. The system of claim 19, wherein instructions that when executed by one or more processors result in the following additional operations comprising:
generating an intermediate input data array wherein a number of dimensions of the intermediate input data array is related to the number of nonunity integer factors of N; and
storing the intermediate input data array in the memory circuitry.

25. The system of claim 24, wherein instructions that when executed by one or more processors result in the following additional operations comprising:
generating an intermediate output array based on the intermediate factors and the intermediate input data array, and
storing the intermediate output array in contiguous memory locations.

26. The system of claim 25, wherein instructions that when executed by one or more processors result in the following additional operations comprising:
generating an output data set corresponding to the FFT of the input data set based at least in part on the intermediate output array.

27. The system of claim 24, wherein instructions that when executed by one or more processors result in the following additional operations comprising:
multiplying a subset of the intermediate input data array by the first subset of the intermediate factors vector and complex conjugates of the second subset of the intermediate factors vector, element by element, to generate a subset of an intermediate output array and storing the subset of the intermediate output array in contiguous memory locations.

* * * * *